United States Patent
Harding et al.

(10) Patent No.: US 7,241,111 B2
(45) Date of Patent: Jul. 10, 2007

(54) CONTOURED DISK BORE

(75) Inventors: Benjamin R. Harding, Ellington, CT (US); Daniel H. Curtiss, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 70 days.

(21) Appl. No.: 10/628,154

(22) Filed: Jul. 28, 2003

(65) Prior Publication Data

US 2005/0025627 A1 Feb. 3, 2005

(51) Int. Cl.
*F01D 5/06* (2006.01)

(52) U.S. Cl. .................. 415/218.1; 416/198 A; 416/244 A

(58) Field of Classification Search ........... 415/218.1; 416/201 R, 198 A, 244 A
See application file for complete search history.

(56) References Cited

U.S. PATENT DOCUMENTS

| | | | |
|---|---|---|---|
| 3,698,750 A | * | 10/1972 | Eastcott et al. ......... 416/244 A |
| 4,417,855 A | * | 11/1983 | Jepsen .................. 416/244 A |
| 4,648,796 A | * | 3/1987 | Maghenzani ............. 415/218.1 |
| 4,832,574 A | * | 5/1989 | Woodwell et al. ...... 416/244 A |
| 4,836,750 A | * | 6/1989 | Modafferi et al. ...... 416/244 A |
| 4,844,694 A | * | 7/1989 | Naudet .................... 416/198 A |
| 5,049,017 A | * | 9/1991 | Reynolds .................... 411/432 |
| 5,236,307 A | * | 8/1993 | Ng et al. .................... 416/147 |
| 5,542,324 A | | 8/1996 | Hormannsdorfer |

FOREIGN PATENT DOCUMENTS

| | | |
|---|---|---|
| DE | 213 421 C | 9/1908 |
| DE | 854604 C | 11/1952 |
| DE | 3400835 A1 | 7/1985 |
| JP | 62251403 A * | 11/1987 |

OTHER PUBLICATIONS

European Search Report for EP Patent Application NO. 04254496.5.

* cited by examiner

*Primary Examiner*—Igor Kershteyn
(74) *Attorney, Agent, or Firm*—Bachman & LaPointe, P.C.

(57) ABSTRACT

A turbine disk comprising a disk bore disposed about a centerline, the disk bore comprising a bore width, and a web extending radially away from the disk bore wherein the disk bore comprises in cross-section a contoured shape comprising a contour depth.

7 Claims, 2 Drawing Sheets

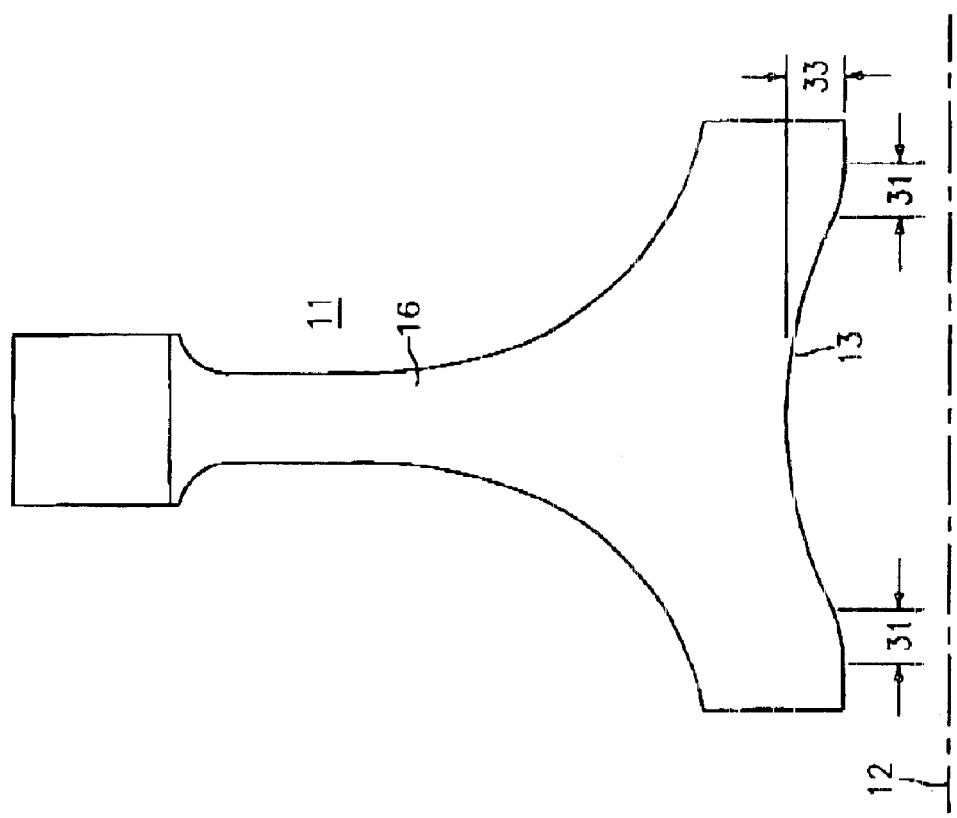
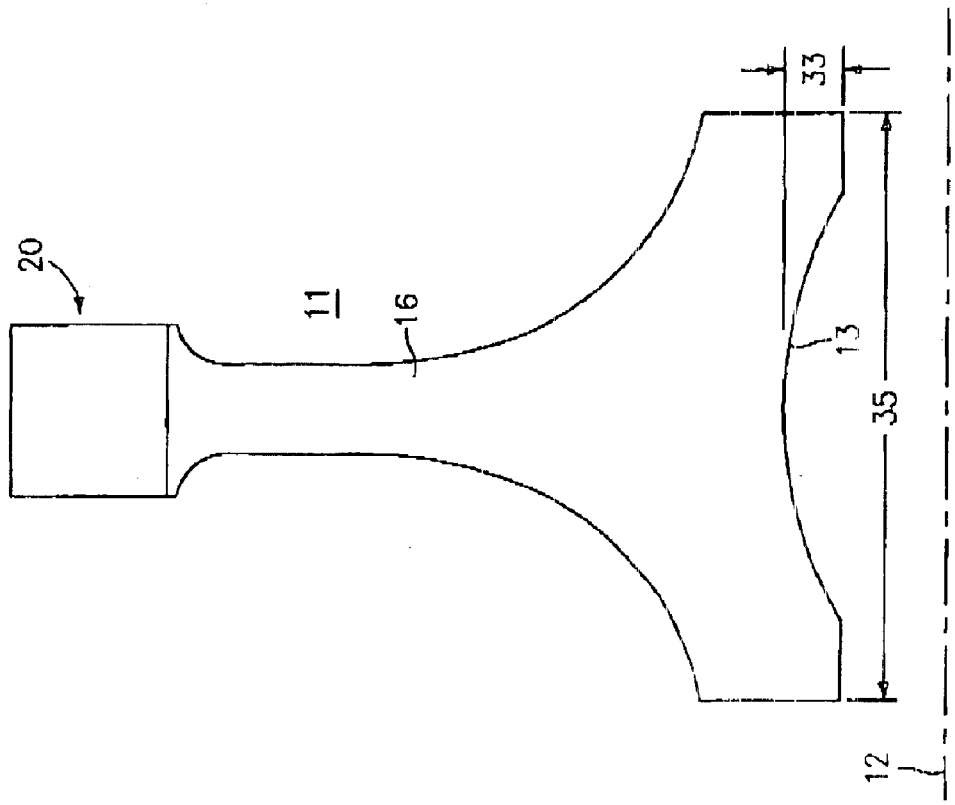

CONTOURED DISK BORE

U.S. GOVERNMENT RIGHTS

The invention was made with U.S. Government support under contract F33615-97-C-2779 awarded by the U.S. Air Force. The U.S. Government has certain rights in the invention.

BACKGROUND OF THE INVENTION (1) Field of the Invention

The present invention relates to turbine disk constructed to minimize the maximum hoop stress experienced across the disk bore. More specifically, the present invention teaches a disk bore contoured so as to increase performance and reduce weight.

(2) Description of Related Art

It is known in the art to fabricate high pressure turbine disks for gas turbine engines, particularly those for aircraft gas turbine engines. With reference to FIG. 1, there is illustrated an exemplary turbine disk known in the art. Disk 11 is shown in cross-section with accompanying centerline 12 about which disk 11 rotates through 360°. Disk 11 is comprised, generally, of a cylindrical disk bore 13 connected to a rim 20 via a web 16. Rim 20 is of a rim width 19. In addition, rim 20 extends away from centerline 12 for a distance extending between live rim radius 15 and dead radius 17. As illustrated in cross-section, disk bore 13 appears as a straight line parallel to centerline 12. When rotated through 360°, disk bore 13 forms the surface of a cylinder extending the width of disk bore 13.

In operation, disk 11 rotates around centerline 12 at high speed. As a result of this rotation, disk bore 13 experiences circumreferential hoop stress. This hoop stress is not constant across the disk bore 13, but, rather, may vary across the width of disk bore 13. In an exemplary instance, the hoop stress experienced at the ends of the disk bore 13 can be 140 KSI with a center disk bore 13 hoop stress of 160 KSI. This results in a hoop stress differential of 20 KSI. The differences arising in the hoop stress present across the disk bore present engineering challenges. Too great a hoop stress differential across disk bore 13 may result in failure of the disk 11 when in operation. It is therefore advantageous to create a disk bore 13 which experiences more uniform hoop stress across disk bore 13 in operation. In other words, it is preferable to minimize the maximum hoop stress differential experienced across disk bore 13.

With reference to FIG. 2, there is illustrated one solution to the problem of minimizing the maximum hoop stress differential experienced across a disk bore 13. Specifically, there is illustrated a dual web disk 11. Dual web disk 11 makes use of two webs 16, 16' to attach the disk bore 13 to the rim 20. While such an arrangement is quite successful in minimizing the maximum hoop stress differential experienced by the disk bore 13, it presents various difficulties in fabricating a disk 11 of such complexity, and subsequently results in an expensive configuration to fabricate.

What is therefore needed is a simple design similar to the disk 11 illustrated in FIG. 1, which serves to minimize the maximum hoop stress differential in an efficient manner as does the dual web disk 11 of FIG. 2, but which is both simple to fabricate, and therefore relatively cheap to construct.

SUMMARY OF THE INVENTION

Accordingly, it is an object of the present invention to provide a turbine disk constructed to minimize the maximum hoop stress experienced across the disk bore. More specifically, the present invention teaches a disk bore contoured so as to increase performance and reduce weight.

It is a further object of the present invention to provide a turbine disk which comprises a disk bore disposed about a centerline, the disk bore comprising a bore width, and a web extending radially away from the disk bore wherein the disk bore comprises in cross-section a contoured shape comprising a contour depth.

BRIEF DESCRIPTION OF THE DRAWINGS

FIG. 3A A cross section diagram of the turbine disk of the present invention illustrating the contoured disk bore.

FIG. 3B A cross section diagram of the turbine disk of the present invention illustrating an alternative embodiment of the contoured disk bore.

DETAILED DESCRIPTION OF THE PREFERRED EMBODIMENT(S)

Figure 1:
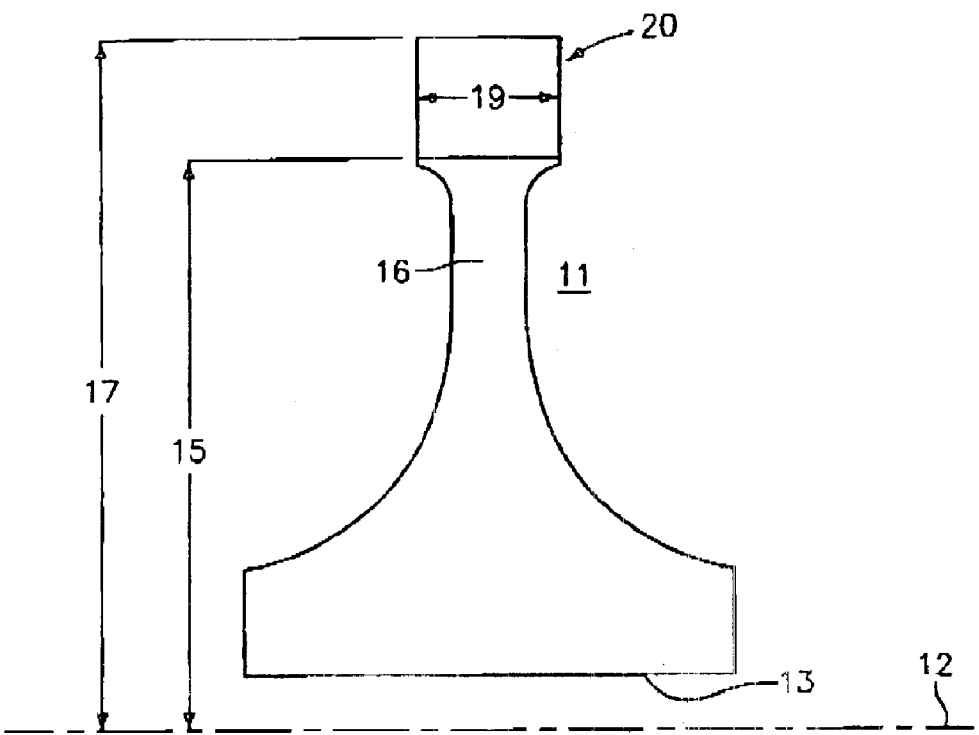
FIG. 1 A cross section diagram of a turbine disk known in the art.
Figure 2:
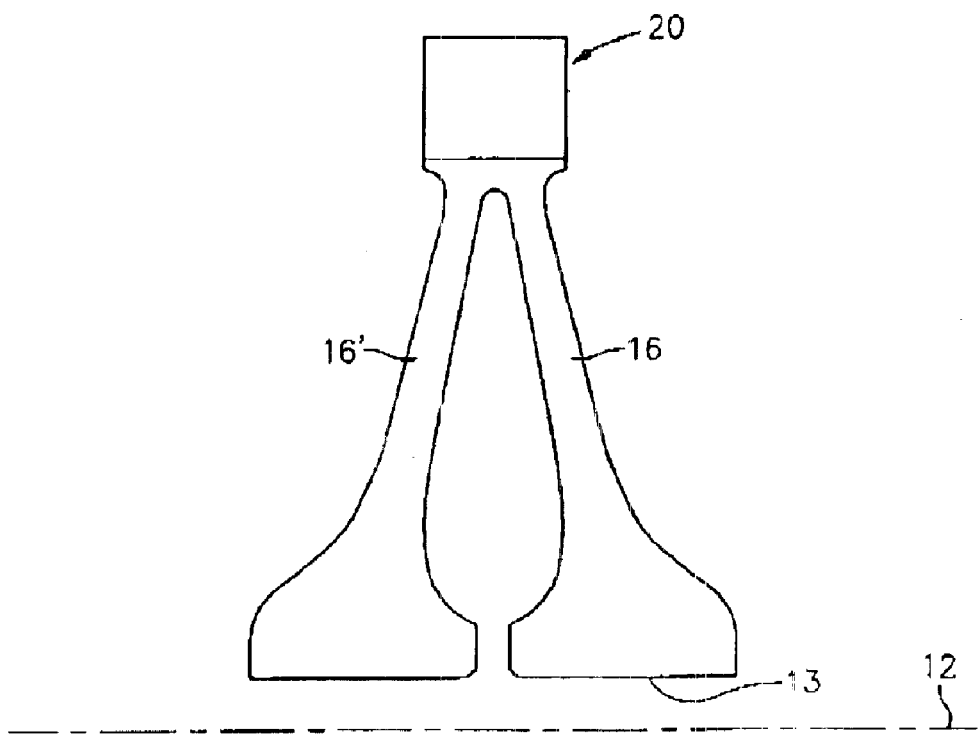
FIG. 2 A cross section diagram of a dual-web turbine disk known in the art.

It is therefore a central purpose of the present invention to teach the construction of a disk 11 which is both simple and economical to fabricate, but which serves to minimize the maximum hoop stress realized across the disk bore 13 and which minimizes the maximum hoop stress differential present across the disk bore 13. The purpose is achieved by teaching the construction of a disk 11 wherein the weight of the disk 11 is reduced by distributing the maximum stress in the area of the disk bore 13 through a contoured shape.

With reference to FIG. 3A, there is depicted a cross-section of the disk 11 of the present invention. Disk 11 is comprised, generally, of a disk bore 13 connected to a rim 20 via a single web 16. Note that disk bore 13 is differentiated from that of the related art discussed above, primarily by the contoured, curving shape of its construction.

Specifically, disk bore 13 does not form, in cross-section, a straight line parallel to centerline 12. As can be seen, disk bore 13 is formed of a contoured, gently curving expanse. As constructed, disk bore 13 extends for a distance equal to contoured depth 33 into said disk 11 away from the centerline 12. When rotated about centerline 12 through 360°, the volume cut out by disk bore 13 deviates significantly from that of a cylinder as the sides of the volume are not flat, but are contoured away from centerline 12.

The shape of the contoured disk bore 13 may be any shape sufficient to requisitely lessen the maximum hoop stress experienced across disk bore 13. In a preferred embodiment, the ratio of the contoured depth 33 to the disk bore width 35 is between 0.04 and 0.12. Most preferably, the ratio of the contour depth 33 to the bore width 35 is greater than 0.05.

As illustrated, disk bore 13 is preferably gently curving. As such, disk bore 13 preferably assumes the shape of a conic section, including, but not limited to, a semi-circle. As illustrated, a curve portion of disk bore 13 intersects with the flat portion of disk bore 13 present at the edges of disk bore 13. With reference to FIG. 3B, there is illustrated a preferred embodiment of disk 11 wherein the curved portion of disk bore 13 is integrated into the flat portions of disk bore 13 via the implementation of a blend area 31. Blend area 31 forms a gently curving intersection between the curved portion of disk bore 13 and the flat edges of disk bore 13.

Test performed using a disk bore 13 of the present invention reveal that a contour having a depth 33 and width sufficient to remove approximately 5% of the total weight of the disk 11 results in an approximate 25% decrease in the maximum hoop stress differential at 16000 RPM as compared to a disk 11 having a flat disk bore 13.

It is apparent that there has been provided in accordance with the present invention a turbine disk constructed to minimize the maximum hoop stress experienced across the disk bore which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A disk, comprising:

a disk bore disposed about a centerline, said disk bore having a bore width; and said disk bore comprising a contoured shape having a contour depth, wherein said disk bore further comprises a ratio of said contour depth divided by said bore width of between 0.4 and 0.12.

2. The disk of claim 1, wherein said contoured shape is a smooth curve.

3. The disk of claim 2, wherein said smooth curve is a conic section.

4. The disk of claim 3, wherein said smooth curve is semi circular.

5. The disk of claim 1, wherein said contoured shape comprises a blend radius.

6. The disk of claim 1, wherein said ratio is greater than 0.05.

7. The disk of claim 1, wherein said contour depth and said bore width reduce a maximum hoop stress differential across said disk bore as compared to a disk bore having a contour depth equal to 0.

* * * * *